United States Patent [19]

Phoenix et al.

[11] 3,745,392

[45] July 10, 1973

[54] DEVICE FOR MEASURING THE FREQUENCY OF ROTATION OF A VEHICLE WHEEL

[75] Inventors: Lancelot Phoenix, Handsworth Wood; David Valentine Walpole, Hall Green, both of England

[73] Assignee: Joseph Lucas (Industries) Limited, Birmingham, England

[22] Filed: Nov. 10, 1970

[21] Appl. No.: 88,368

[30] Foreign Application Priority Data
Nov. 10, 1969 Great Britain.................. 54,872/69
June 13, 1970 Great Britain.................. 28,746/70

[52] U.S. Cl................................. 310/168, 324/173
[51] Int. Cl. ............................................. G01p 3/48
[58] Field of Search.................... 324/173, 174, 163, 324/34 GT, 34 P, 34 D; 310/86, 155, 168; 340/263; 303/21 EB, 21 CF, 21 CG, 21 P, 21 AP

[56] References Cited
UNITED STATES PATENTS
2,882,516   4/1959   Neerguard........................ 324/34 P
3,653,471   4/1972   Burckhardt........................ 324/174
3,489,935   1/1970   Hayes ................................ 310/168
3,551,712   12/1970  Jones ................................ 310/168
3,482,129   12/1969  Riordan ............................. 310/168

FOREIGN PATENTS OR APPLICATIONS
1,088,106   10/1967  Great Britain..................... 324/174

*Primary Examiner*—Michael J. Lynch
*Attorney*—Holman & Stern

[57] ABSTRACT

A device for measuring the frequency of rotation of a vehicle wheel comprises a toothed wheel rotatable with the vehicle wheel, and an electromagnetic pick-up winding past which in use the teeth move to produce pulses in the winding. The toothed wheel is provided with a layer of non-magnetic material which covers the crown of each tooth, the pick-up winding moving over the layer of the non-magnetic material and being resiliently urged towards the toothed wheel so as not to be disengaged from the layer in use. The arrangement of the layer of non-magnetic material is such that the winding remains at a constant distance from the teeth as the winding moves over the layer.

8 Claims, 4 Drawing Figures

DEVICE FOR MEASURING THE FREQUENCY OF ROTATION OF A VEHICLE WHEEL

This invention relates to a device for measuring the frequency of rotation of a vehicle wheel.

A device according to the invention comprises a toothed wheel rotatable with the vehicle wheel, and an electromagnetic pick-up winding past which in use the teeth move to produce pulses in said winding, the toothed wheel being provided with a layer of non-magnetic material which covers the crown of each tooth, the pick-up winding moving over said layer of the non-magnetic material and being resiliently urged towards said toothed wheel so as not to be disengaged from said layer in use, the arrangement of said layer being such that said winding remains at a constant distance from the teeth as the winding moves over said layer.

Figure 1:
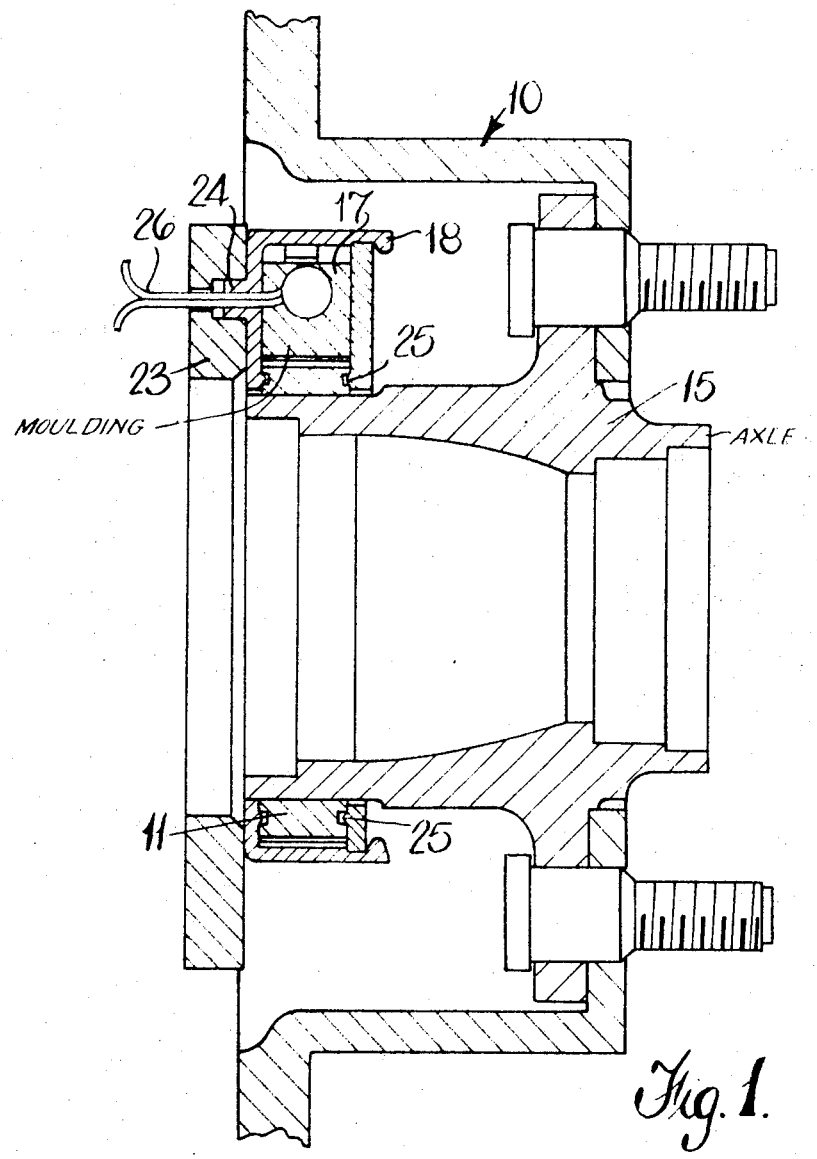
Figure 2:
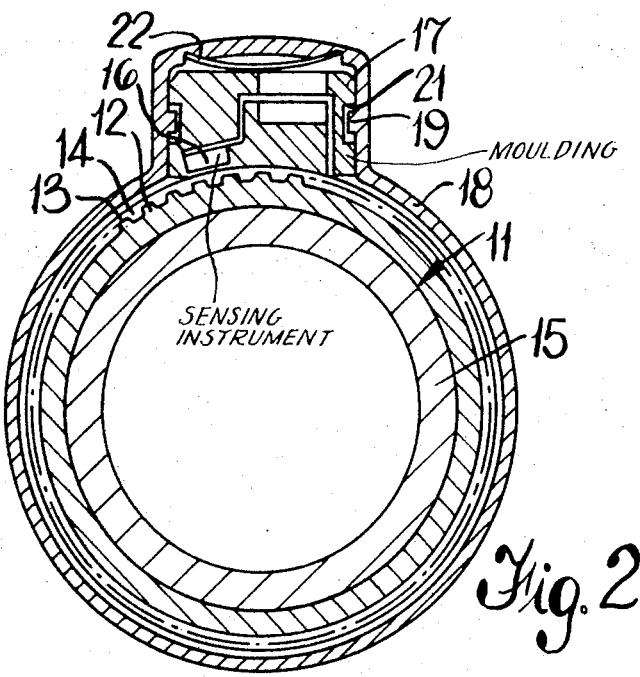
Figure 3:
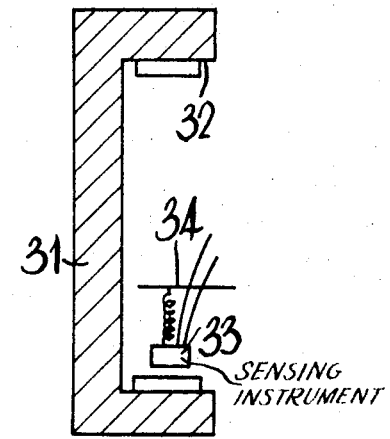
Figure 4:
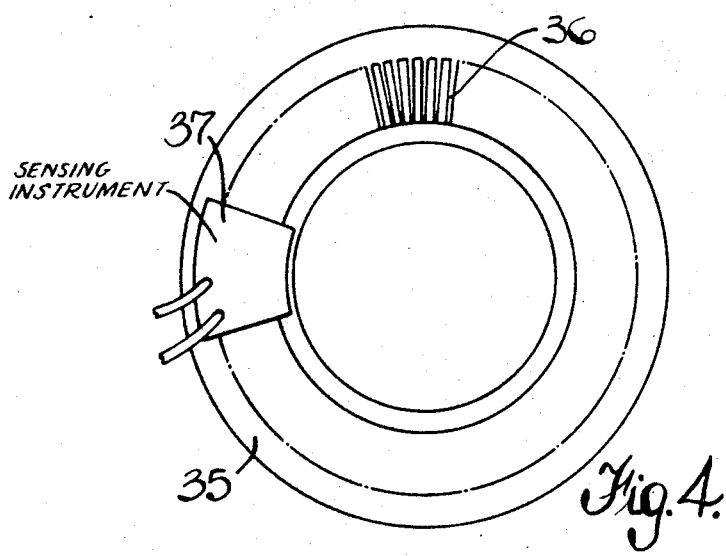

In the accompanying drawings:

FIG. 1 is a sectional view of a frequency sensing device according to one example of the invention when mounted on the axle of a wheel of a road vehicle, FIG. 2 is a sectional view of FIG. 1, FIG. 3 is a diagrammatic representation of a frequency sensing device according to a second example of the invention, and FIG. 4 is a plan view of a frequency sensing device according to a third example of the invention.

Referring to FIGS. 1 and 2, a frequency sensing device includes an annular, externally toothed wheel 11, the wheel being accurately machined so that there is a fixed, predetermined distance between adjacent teeth 12 on the wheel and also so that the crowns 13 of the teeth 12 define an external cylindrical surface. A layer 14 of non-magnetic material having a low coefficient of friction such as glass filled nylon is moulded around the teeth 12 of the wheel 11 so as to fill the gaps between the teeth and cover the crowns of the teeth. The layer 14 is then machined so that there is an even thickness of the filled nylon over the crown of each of the teeth 12 and so that the periphery of the layer 14 is cylindrical and co-axial with the wheel 11. In the example shown, the wheel 11 is mounted on the axle 15 of a wheel 10 of a road vehicle for rotation therewith and a sensing instrument 16 is mounted adjacent the layer 14 so as to move over the layer 14 as the wheel 11 rotates in use. The instrument 16 is supported in non-magnetic, synthetic resin moulding 17 preferably formed of a material having a low coefficient of friction such as glass filled nylon, the moulding 17 engaging the layer 14 and the wheel 11 being free to rotate relative to the moulding 17 and the instrument 16. The moulding 17 is supported in a two-part, annular casing 18 by a pair of lugs 19 integral with the casing 18, the lugs being engaged in a pair of recesses 21 respectively formed in opposite sides of the moulding 17. The moulding 17 is resiliently urged towards the toothed wheel 11 by a spring blade 22, the dimensions of the recesses 21 being such that the moulding 17 is capable of movement relative to the lugs towards and away from the wheel 11. Thus, the moulding 17 remains in contact with the layer 14 during rotation of the wheel 11 despite any small eccentricities which may be present in the layer 14. As shown in FIG. 1, the casing 18 is mounted on the brake back plate 23 of the vehicle wheel 10 by a locating peg 24 integral with the casing 18. The brake back plate 23 is of course, movable vertically with the axle 15 so that the moulding 17 is urged by the spring blade 22 to remain in contact with the layer 14 during any upward or downward movement of the axle 15, that may occur during rotation. Further the toothed wheel 11 is rotatably mounted in the casing 18 by a pair of annular ribs 25 integral with the casing 18 and engaging in complementary annular recesses respectively formed in opposite lateral faces of the wheel 11.

The layer 14 of filled nylon is a non-magnetic layer and the sensing instrument 16 incorporates pick-up winding, so that each time a tooth 12 passes the instrument an electrical impulse is produced in the pick-up winding and is fed by leads 26 extending through the peg 14 to an external circuit for measuring the frequency of rotation of the toothed wheel 11 and hence of the vehicle wheel 10.

In a practical embodiment of the above example of the invention, the frequency sensing instrument is used in an antilock braking system for a road vehicle, the arrangement being such that if the retardation of the wheel 10 exceeds a predetermined value, corresponding to locking of the brakes acting on the wheel, then the brakes are automatically disengaged. For the anti-lock brakes to respond quickly to a situation wherein the wheels of the vehicle are locked, it is necessary to have a high rate of production of electrical impulses in the pick-up winding of the sensing instrument 16. Thus the wheel 11 is required to have a large number of teeth, for example 180, so that the gap between adjacent teeth is very small and so for accurate sensing of the vehicle wheel speed by the device, the instrument 16 must be mounted very close to the toothed wheel and at a constant distance from the teeth. Thus a small constant thickness of the non-magnetic material (about 0.015 inch) is formed over the teeth, and also since the spring blade 22 urges the moulding 17 towards the toothed wheel, the gap between the pick-up winding and the teeth is kept small and substantially constant as required.

In a second example of the invention, as illustrated in FIG. 3, the frequency sensing device includes an internally toothed wheel 31. So that the sensing instrument 16 can move over the internal surface of the wheel, the wheel is provided with a peripheral flange 32 in the internal surface of which the teeth are formed. The wheel 31 is formed in the same way as in the above example, a sensing instrument 33 being resiliently urged towards the internal, toothed surface of the wheel and being mounted on a support 34 which moves vertically with the vehicle wheel.

FIG. 4 illustrates a third example of the invention in which the construction and operation of the sensing device is similar to those described above, except that the toothed wheel is defined by an annular wheel 35 formed with an annular row of teeth 36 on one lateral surface of the wheel, a sensing instrument 37 moving over the teeth 36.

It is to be appreciated that in the above examples the arrangement of the layer 14 of non-magnetic material can be altered so that layer 14 extends over the crowns of the teeth and the gaps between the teeth without actually filling the gaps. Alternatively the layer 14 can be arranged so as to cover only the crown of each tooth, although in this case the dimensions of the sensing instrument 16 must be greater than the distance between adjacent teeth.

We claim:

1. A device for measuring the frequency of rotation of a vehicle wheel comprising a toothed wheel rotatable with the vehicle wheel, an electro-magnetic pick-up winding, means mounting the pick-up winding adjacent the toothed wheel so that, in use, the teeth of said wheel move past the winding to produce pulses in the winding, a layer of non-magnetic material covering the crown of each tooth of said wheel, and resilient means urging the pick-up winding towards the toothed wheel so that the pick-up winding is always engaged with said layer of non-magnetic material as the teeth of said wheel move past the winding, the arrangement of said layer being such that the winding remains at a constant distance from the teeth as the teeth move past the winding.

2. A device as claimed in claim 1 wherein said layer of non-magnetic material is arranged to extend over the crowns of the teeth and the gaps between the teeth without filling said gaps between the teeth.

3. A device as claimed in claim 1 wherein said layer of non-magnetic material is arranged to cover the crowns of the teeth and fill the gaps between the teeth.

4. A device as claimed in claim 1 wherein said toothed wheel is an externally toothed wheel with said teeth being formed on the external cylindrical surface of the wheel.

5. A device as claimed in claim 1 wherein said toothed wheel is internally toothed and includes a peripheral flange in the internal surface of which said teeth are formed.

6. A device as claimed in claim 1 wherein said teeth are formed as an annular row on one lateral surface of the wheel.

7. A device as claimed in claim 1 wherein a non-magnetic synthetic resin moulding supports the pick-up winding.

8. A device for measuring the frequency of rotation of a vehicle wheel comprising an annular casing, means for mounting the casing on a member which moves vertically with the vehicle wheel, a toothed wheel rotatably mounted in the casing, the toothed wheel being rotatable with the vehicle wheel in use, a layer of non-magnetic material covering the crown of each tooth of said toothed wheel, a non-magnetic synthetic resin moulding mounted in the casing, an electro-magnetic pick-up winding supported by said synthetic resin moulding, means mounting the pick-up winding adjacent the toothed wheel so that, in use, the teeth of said wheel move past the winding to produce pulses in the winding, and resilient means urging the moulding into engagement with said layer of non-magnetic material so that the moulding always engages said layer as the teeth of said wheel move past the pick-up winding in use, the arrangement of said layer of non-magnetic material being such that the winding remains at a constant distance from the teeth as the teeth move past the pick-up winding.

* * * * *